(12) United States Patent
Spahn et al.

(10) Patent No.: US 7,963,602 B2
(45) Date of Patent: Jun. 21, 2011

(54) VEHICLE SEATING SYSTEM INCLUDING SEAT MOUNTED REVERSIBLE PELVIC BOLSTER

(75) Inventors: Brian Robert Spahn, Plymouth, MI (US); Ian Brewster Hall, Silver Spring, MD (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/328,322

(22) Filed: Dec. 4, 2008

(65) Prior Publication Data

US 2010/0140990 A1 Jun. 10, 2010

(51) Int. Cl.
*B60N 2/427* (2006.01)
*B60R 21/02* (2006.01)

(52) U.S. Cl. ................ 297/216.13; 297/284.9
(58) Field of Classification Search ............ 297/216.1, 297/411.32, 488, 115, 411.38, 216.13, 284.9, 297/217.3
See application file for complete search history.

(56) References Cited

U.S. PATENT DOCUMENTS

| | | | | |
|---|---|---|---|---|
| 3,888,540 A | * | 6/1975 | Protze et al. | 297/486 |
| 4,030,749 A | * | 6/1977 | Strahm | 297/344.18 |
| 4,176,878 A | * | 12/1979 | Koutsky | 297/115 |
| 5,411,317 A | * | 5/1995 | Faust et al. | 297/452.3 |
| 5,667,241 A | | 9/1997 | Bunker et al. | |
| 5,918,926 A | * | 7/1999 | Townsend | 296/65.01 |
| 6,142,563 A | * | 11/2000 | Townsend et al. | 297/216.1 |
| 6,217,119 B1 | * | 4/2001 | Cook et al. | 297/411.32 |
| 6,471,297 B1 | * | 10/2002 | Runde et al. | 297/411.32 |
| 6,530,622 B1 | * | 3/2003 | Ekern et al. | 297/284.4 |
| 6,682,143 B2 | * | 1/2004 | Amirault et al. | 297/250.1 |
| 7,124,851 B2 | | 10/2006 | Smith et al. | |
| 7,219,957 B1 | * | 5/2007 | Khouri | 297/216.1 |
| 7,264,271 B2 | | 9/2007 | Barvosa-Carter et al. | |
| 2004/0124687 A1 | * | 7/2004 | Nae et al. | 297/411.32 |
| 2005/0218632 A1 | | 10/2005 | Cuevas et al. | |
| 2006/0043777 A1 | * | 3/2006 | Friedman et al. | 297/216.13 |
| 2007/0102905 A1 | | 5/2007 | Ryan et al. | |
| 2007/0228713 A1 | | 10/2007 | Takemura | |
| 2008/0111406 A1 | * | 5/2008 | Friedman | 297/216.1 |

FOREIGN PATENT DOCUMENTS

| | | | |
|---|---|---|---|
| WO | WO 9948720 A1 | * | 9/1999 |
| WO | 2005016703 A1 | | 2/2005 |
| WO | 2008041904 A1 | | 4/2008 |

OTHER PUBLICATIONS

Steve Fredin, "Maintaining Technical Leadership in Automotive Safety", Autoliv Inc. presentation, Investor & Analyst Conference, Sep. 14, 2007, Dachau, Germany.

* cited by examiner

*Primary Examiner* — Milton Nelson, Jr.
(74) *Attorney, Agent, or Firm* — Shook, Hardy & Bacon LLP

(57) ABSTRACT

A vehicle system for aiding in the protection of a vehicle occupant is disclosed. The system includes a seat assembly having a seat base and a seat back and a pelvic bolster rotatably attached to the seat back of the seat assembly. The pelvic bolster is rotatably movable between a first stowed position and a second deployed position. A reversible motor drives the pelvic bolster between its stowed position and its deployed position. The system further includes a threat condition sensor operatively associated with the reversible motor.

9 Claims, 3 Drawing Sheets

VEHICLE SEATING SYSTEM INCLUDING SEAT MOUNTED REVERSIBLE PELVIC BOLSTER

TECHNICAL FIELD

The disclosed invention relates generally to pelvic bolsters for vehicle seats. More particularly, the disclosed invention relates to a seat mounted reversible pelvic bolster which is movable between a stowed position and a deployed position in response to a detected threat condition.

BACKGROUND OF THE INVENTION

Side impact events in vehicles have been identified as one of the top priorities for both research and regulation with government requirements continuing to become more stringent. Continued development and progress in side impact systems has significant real world benefit. Current systems primarily use airbags and static door bolsters to promote early occupant contact and to limit forces transmitted to the occupant. Early engagement of the pelvis has been shown to be an effective side impact strategy. Traditional pelvic side impact airbags design for this purpose have limitations in achieving optimal stiffness, coverage and positioning due to challenges associated with deployment in very narrow spaces (<3-4 inches) and within extreme timing constraints (<5-10 ms). Conversely, static pelvic door bolsters are limited in their effectiveness to provide early engagement of the pelvis because they rely on door intrusion to bring the surface of the bolster in contact with the pelvis.

The introduction of pre-crash sensor systems poses opportunities for improvement in the deployment of traditional side airbags. However, in order to take full advantage of the additional time afforded by pre-crash sensors, a decision to deploy may need to be made with less than 100% confidence of an event. In this situation, traditional airbags again have limitations as they are not reversible or resettable in the event they are deployed pre-crash for an impact that does not actually occur.

Accordingly, as in so many areas of vehicle technology, there is room in the art of pelvic bolster design for an alternative configuration to known pelvic bolster structures which provides effective protection that can be adapted to a variety of shapes while maintaining relatively low manufacturing and assembly costs.

SUMMARY OF THE INVENTION

The disclosed invention represents advancement in the art of vehicle safety systems. The disclosed invention provides a system for aiding in the protection of a vehicle occupant. The system includes a seat assembly having a seat base, a seat back and a pelvic bolster rotatably attached to the seat back of the seat assembly. The pelvic bolster is rotatably movable between a first stowed position and a second deployed position. A reversible motor drives the pelvic bolster between its stowed position and its deployed position. The system further includes a threat condition sensor operatively associated with the reversible motor. The seat back includes a recessed region for substantially receiving the pelvic bolster when in its stowed position.

The pelvic bolster includes a first end pivotably attached to the seat back and a second end. When the pelvic bolster is in its stowed position the second end of the bolster generally points toward the roof of the vehicle. When the pelvic bolster is in its deployed position the second end of the bolster generally points vehicle forward, thus providing protection between the vehicle seat and the vehicle door trim.

Other advantages and features of the invention will become apparent when viewed in light of the detailed description of the preferred embodiment when taken in conjunction with the attached drawings and the appended claims.

BRIEF DESCRIPTION OF THE DRAWINGS

For a more complete understanding of this invention, reference should now be made to the embodiment illustrated in greater detail in the accompanying drawings and described below by way of examples of the invention wherein.

DETAILED DESCRIPTION OF THE PREFERRED EMBODIMENT

Figure 1:
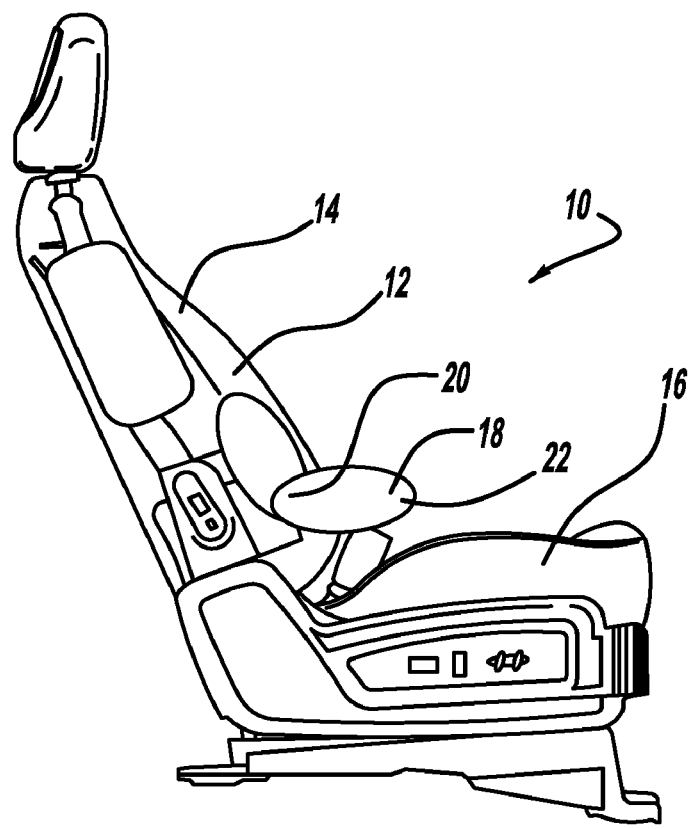
FIG. 1 illustrates a side view of a an embodiment of the seat mounted movable pelvic bolster according to the disclosed invention illustrating the bolster in its deployed position.

In the following figures, the same reference numerals are used to refer to the same components. In the following description, various operating parameters and components are described for one constructed embodiment. These specific parameters and components are included as examples and are not meant to be limiting.

Several technologies exist to provide the same general function of provided early pelvis engagement in side impacts. Many of these existing technologies are mounted in the door trim and structure. Door mounted side impact technologies have limitations on the position and coverage of the countermeasure to the occupant due to the multitude of occupant sizes and seating positions along the seat track. In general, the solution presented by the disclosed invention as shown in the various figures and as discussed in relation thereto offers advantages over other technologies because it is resettable and because it maintains the same position and coverage relationship to the occupant, being mounted to the seat and not the door trim.

With particular reference to FIGS. 1 through 4, a reversible pelvic bolster seating system, generally illustrated as 10, is shown. The system 10 includes a vehicle seat 12 which includes a vehicle seat back 14 and a vehicle seat base 16. It is to be understood that the vehicle seat 12 is only provided for illustrative purposes and is thus not intended as being limiting. The system 10 of the disclosed invention may find multiple applications, such as use in conjunction with vehicle bench seats (not shown).

The reversible pelvic bolster seating system 10 includes a reversible (and resettable) side impact pelvic bolster 18. The pelvic bolster 18 includes a first end 20 which is pivotably attached to the vehicle seat 12 (preferably but not necessarily to the vehicle seat back 14) and a second end 22 generally opposite the first end 20.

Figure 2:
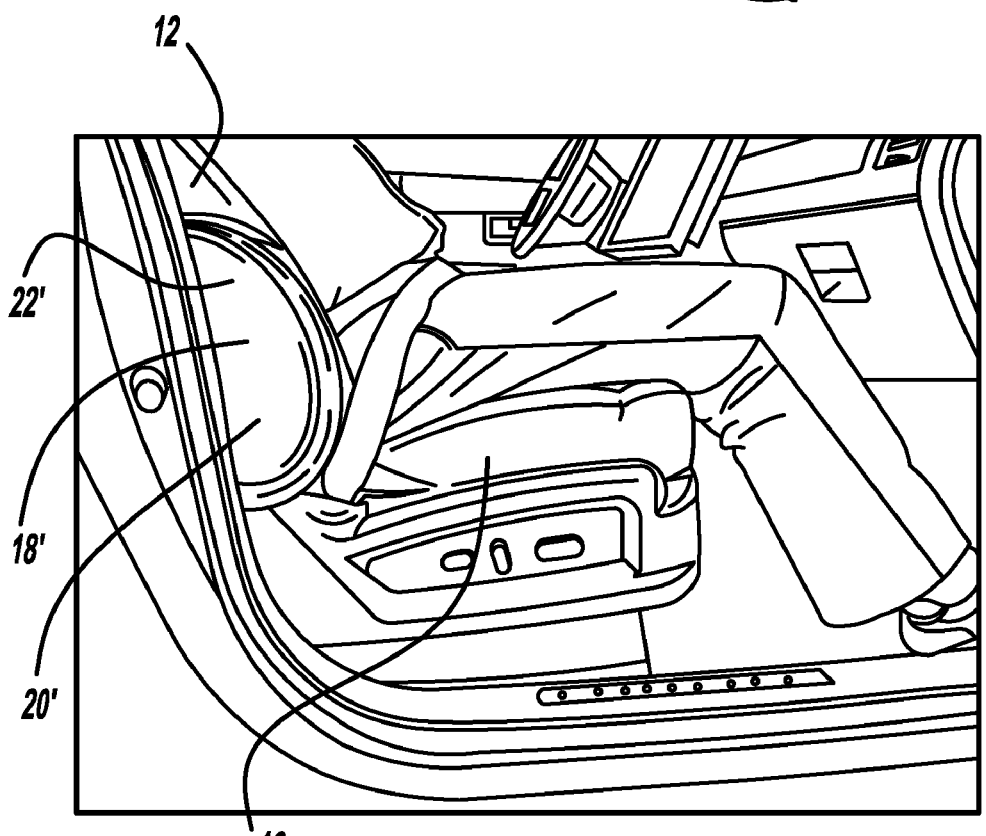
FIG. 2 illustrates a side view of another embodiment of the seat mounted movable pelvic bolster according to the disclosed invention illustrating the bolster in its stowed position.
Figure 3:
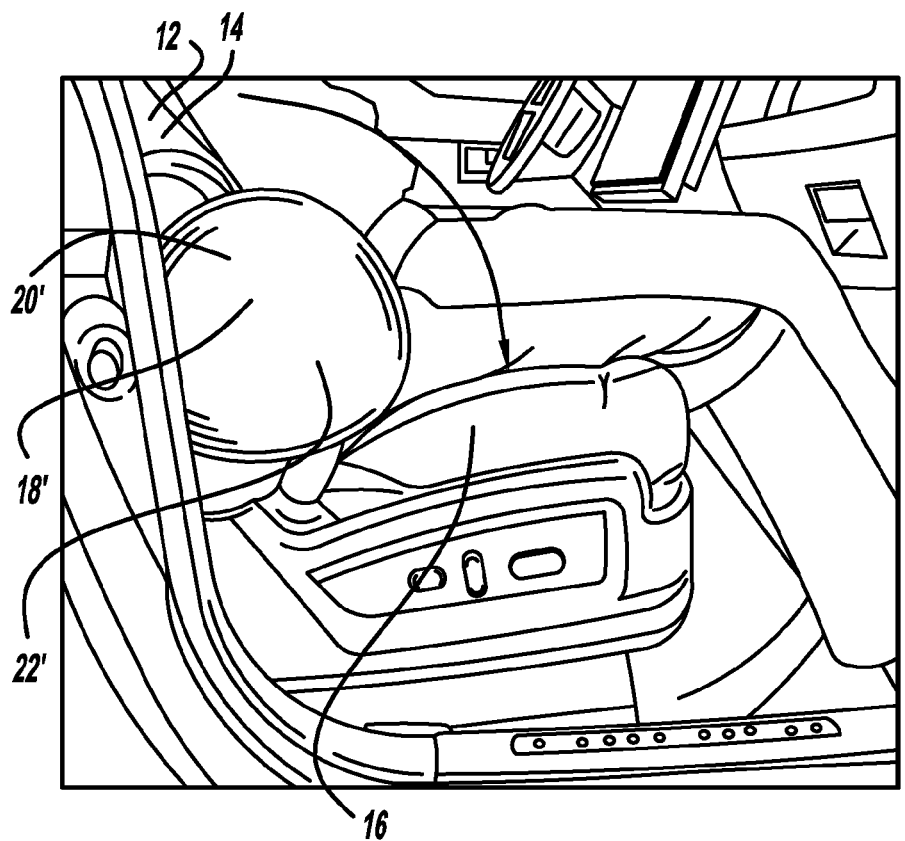
FIG. 3 illustrates the same view as that shown in FIG. 2 but shows instead the pelvic bolster in its deployed position.
Figure 4:
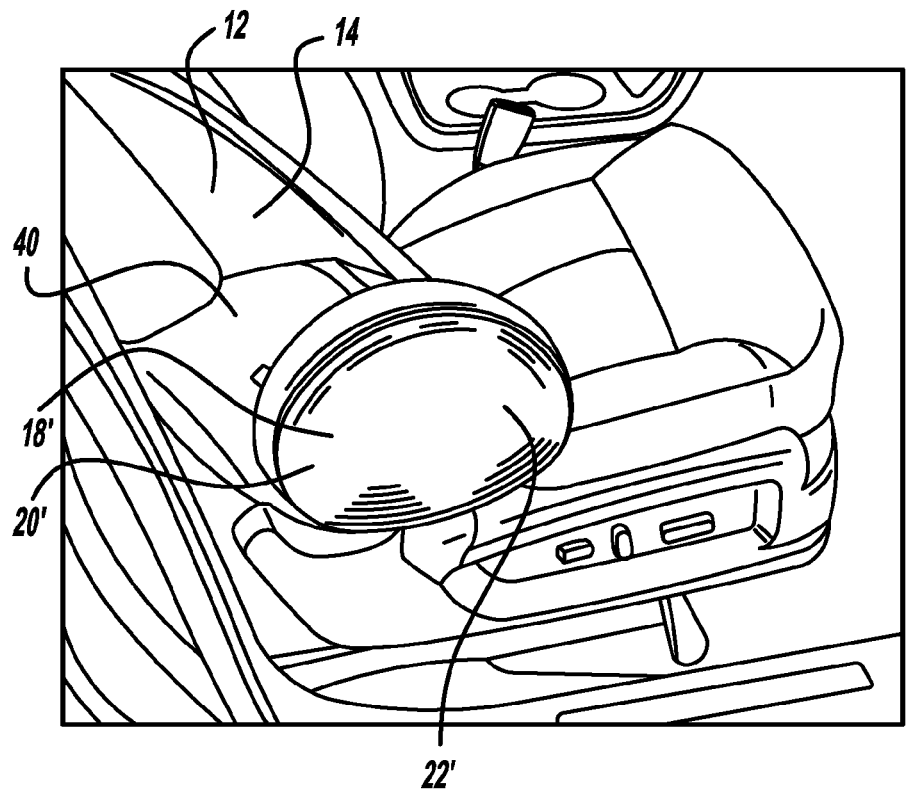
FIG. 4 is a perspective view of the view shown in FIG. 3.

The configuration of the reversible pelvic bolster 18 may be generally an elongated oblong shape as shown in FIG. 1 or may have a more oval shape as shown in FIGS. 2, 3 and 4 as a reversible pelvic bolster 18'. In any event, the general oblong shape of the reversible side impact pelvic bolster 18 as illustrated is a preferred shape due to the rotational deployment path and the package space available for this particular embodiment, but it is to be understood that other shapes may be adapted while still providing an effective absorber of pelvic loads under lateral crash conditions.

With reference to FIGS. 2, 3 and 4, the pelvic bolster 18' includes a first end 20' attached to the vehicle seat 12 (preferably but not necessarily to the vehicle seat back 14) and a second end 22' generally opposite the first end 20'. As shown in FIG. 2, the pelvic bolster 18' is in its stowed or generally upright position with respect to the vehicle seat back 14. In the event of a sensed impact, the pelvic bolster 18' is rotated forward to its deployed position as shown in FIGS. 3 and 4. In this position the pelvic bolster 18' is positioned generally between the occupant's pelvic area and the vehicle door (not shown). As shown in FIG. 4, a recessed area 40 is formed in the side of the vehicle seat back 14. The pelvic bolster 18' substantially fits within the recessed area 40 when in its stowed position.

Figure 5:
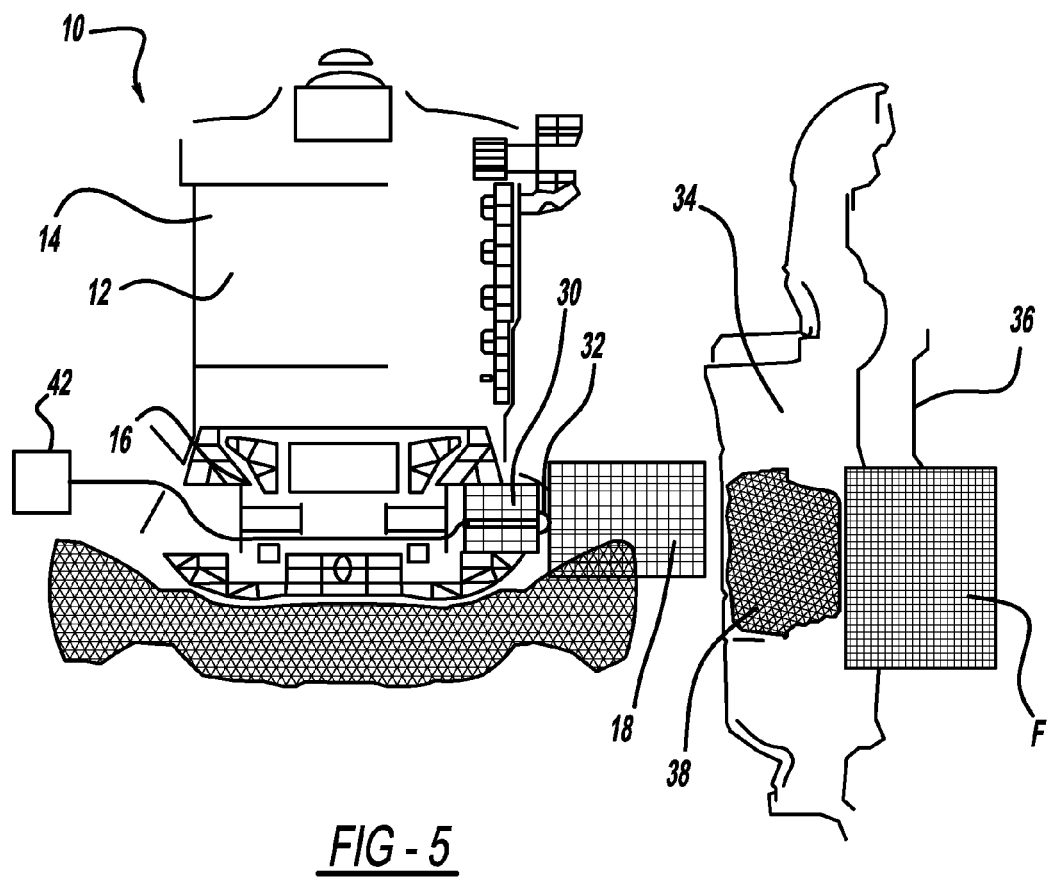
FIG. 5 is a diagrammatic front view of the reversible pelvic bolster of the disclosed invention in relation to a vehicle door trim and an impacting force.

Regardless of the shape of the reversible pelvic bolster as illustrated in the figures, its general function is the same. Particularly, the occupant protection strategy behind side impact tends to promote early engagement combined with load limiting, in order to reduce potentially injurious peak forces. The reversible side impact pelvic bolster 18 (or 18' as the case may be) may enhance occupant performance in side impacts by enabling positioning of a countermeasure prior to impact for improved occupant coverage/positioning and improved control of strength/stiffness characteristics. By nature of its shape, size and location, the reversible side impact pelvic bolster 18 fills the empty space between an occupant's pelvis and the door trim (as shown in FIG. 5 and discussed in relation thereto), enabling early engagement of the pelvis. The reversible nature of this technology allows for conservative deployment thresholds for maximum benefit with minimal risk/inconvenience because the reversible side impact pelvic bolster 18 automatically resets itself to the design position once a threat condition has passed.

Referring to FIG. 5, a diagrammatic front view of the reversible pelvic bolster seating system 10 is illustrated in relation to a vehicle door and an impacting force "F."

A motor 30 is provided to move the reversible side impact pelvic bolster 18 between the stowed position shown in FIG. 2 and the deployed position shown in FIGS. 1, 3, 4 and 5. The motor 30 includes a motor drive shaft 32. Due to the package space and occupant seating comfort, a 4-bar linkage (not shown) may be used to connect the motor drive shaft 32 with the reversible side impact pelvic bolster 18. However, it is to be understood that the reversible pelvic bolster seating system 10 may alternatively rely up the seat recline motor located in the same general vicinity as the motor 30 required to power the reversible pelvic bolster 18. The seat 10 is shown in relation to a vehicle door trim 34 and an outer door sheet metal 36. A pelvic bolster 38 is provided between the vehicle door trim 34 and the outer door sheet metal 36 as is known in the art.

Upon a voltage signal from a seat controller ECU 42, the reversible side impact pelvic bolster 18 will rotate into position so that the bolster 18 will be pre-deployed prior to impact. If an impact occurs, the reversible side impact pelvic bolster 18 will provide early contact to the occupant, providing a more effective pelvic push and reducing peak forces. CAE modeling showed that loading the pelvis early could reduce the peak pelvic loads by ~39%.

In addition to its described function to absorb pelvic loads during a side impact event, the reversible side impact pelvic bolster 18 can also serve as an armrest when in its deployed position as shown in FIGS. 1, 3 and 4. As most clearly illustrated in FIG. 3, the top of the reversible side impact pelvic bolster 18 is at an acceptable height for an armrest. This surface can be used by an occupant (not shown) as the armrest. If it is desired that the reversible side impact pelvic bolster 18 be used as an armrest, an arrangement would be required such that the operator could selectively effect movement of the reversible side impact pelvic bolster 18 by such means as a switch which would override the deployment system and specifically the voltage signal from the seat controller ECU 42.

The reversible side impact pelvic bolster 18 is intended to deploy when a threat condition is detected. Detection of threat conditions may be made with sensor information from existing technologies (RSC or high yaw) or with future sensor technologies (radar, CV sensors, camera, etc.). The reversible nature of this technology allows for conservative deployment thresholds for maximum benefit. Unlike conventional airbags, the reversible side impact pelvic bolster 18 will retract into its stowed position after the threat passes. Should an occupant Out-Of-Position (OOP) situation arise, the reversible side impact pelvic bolster 18 will contact the occupant and retract.

The reversible pelvic bolster seating system 10 disclosed herein provides an early pelvic push, lowering peak load on the occupant. The reversible pelvic bolster seating system 10 uses available motors and fastening locations, thus minimizing assembly cost and time.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A vehicle seat that has a pelvic bolster and that is mountable in a vehicle having a vehicle door, the seat comprising:
   a seat base having a front and a back;
   a seat back operatively associated with said back of said seat base, said seat back having a side;
   a threat condition sensor for detecting an impending crash event;
   a drive motor operatively associated with said sensor, wherein a drive shaft extends from the drive motor; and
   a pelvic bolster having a first end that is operatively coupled to the drive motor via the drive shaft and a second end that generally opposes the first end, the pelvic bolster being rotatably movable between a stowed position in which said bolster is generally adjacent said side of said seat back, such that the second end includes a vertically oriented position, and a deployed position in which said bolster generally rotates forward toward said seat base, such that the second end includes a horizontally oriented position, wherein the drive shaft and the drive motor include a configuration that causes the second end to rotate from the vertically-oriented position to the horizontally-oriented position when the impending crash event is detected by the threat condition sensor.

2. The vehicle seat of claim 1, wherein said pelvic bolster has an upper surface, said upper surface providing support to a vehicle occupant as an armrest.

3. The vehicle seat of claim 1, wherein the drive motor is a reversible drive motor for moving said pelvic bolster between said stowed position and said deployed position.

4. The vehicle seat of claim 1, wherein said side includes a recessed region for substantially receiving said pelvic bolster when in its stowed position.

5. The vehicle seat of claim 1, wherein said pelvic bolster has a shape, said shape being oblong.

6. The vehicle seat of claim 1, wherein said pelvic bolster has a shape, said shape being generally elongate.

7. A system for providing protection to a vehicle occupant, the system comprising:
- a seat assembly, said seat assembly including a seat base and a seat back operatively coupled to the seat base;
- a threat condition sensor for detecting an impending crash event;
- a drive motor operatively associated with said sensor, wherein a drive shaft extends from the drive motor; and
- a pelvic bolster having a first end that is operatively coupled to the drive motor via the drive shaft and a second end that generally opposes the first end, the pelvic bolster being rotatably movable between a stowed position in which said bolster is generally adjacent a side of said seat back, such that the second end includes a vertically oriented position, and a deployed position in which said bolster generally rotates forward toward said seat base, such that the second end includes a horizontally oriented position, wherein the drive shaft and the drive motor include a configuration that causes the second end to rotate from the vertically-oriented position to the horizontally-oriented position when the impending crash event is detected by the threat condition sensor.

8. The system of claim 7, wherein said pelvic bolster is attached to said seat back.

9. The system of claim 7, wherein the side includes a recessed region for substantially receiving said pelvic bolster when in its stowed position.

* * * * *